United States Patent
Gaál

(10) Patent No.: US 8,107,681 B2
(45) Date of Patent: Jan. 31, 2012

(54) SETUP FOR CONSTRUCTING A WEED MAP

(75) Inventor: József Gaál, Szeged (HU)

(73) Assignee: G & G Növényvédelmi és Kereskedelmi K ft., Szeged (HU)

( * ) Notice: Subject to any disclaimer, the term of this patent is extended or adjusted under 35 U.S.C. 154(b) by 662 days.

(21) Appl. No.: 12/298,945

(22) PCT Filed: Apr. 28, 2006

(86) PCT No.: PCT/HU2006/000038
§ 371 (c)(1),
(2), (4) Date: Feb. 9, 2009

(87) PCT Pub. No.: WO2006/117581
PCT Pub. Date: Nov. 9, 2006

(65) Prior Publication Data
US 2009/0226036 A1    Sep. 10, 2009

(30) Foreign Application Priority Data
Apr. 29, 2005  (HU) .................................. 0500100 U

(51) Int. Cl.
G06K 9/00 (2006.01)
G01C 21/00 (2006.01)

(52) U.S. Cl. .................. 382/103; 701/213; 701/208

(58) Field of Classification Search .................. 382/103; 701/213, 50, 208, 207, 214; 250/221.226; 356/407, 416, 425; 209/577, 579, 580, 582
See application file for complete search history.

(56) References Cited

U.S. PATENT DOCUMENTS

| | | |
|---|---|---|
| 5,793,035 A | 8/1998 | Beck et al. |
| 5,809,440 A | 9/1998 | Beck et al. |
| 6,516,271 B2 * | 2/2003 | Upadhyaya et al. .......... 701/213 |
| 6,553,312 B2 * | 4/2003 | Upadhyaya et al. .......... 701/213 |
| 6,941,225 B2 * | 9/2005 | Upadhyaya et al. .......... 701/213 |
| 2003/0159633 A1* | 8/2003 | Upadhyaya et al. .......... 111/200 |
| 2004/0149893 A1* | 8/2004 | Scott ............................ 250/221 |

FOREIGN PATENT DOCUMENTS

| | | | |
|---|---|---|---|
| CN | 1936919 | * | 9/2005 |
| DE | 4132637 A1 | | 4/1993 |
| EP | 1000540 A1 | | 5/2000 |
| TW | 231375 B | | 4/2005 |
| WO | 9917606 | | 4/1999 |
| WO | 2004005625 A1 | | 1/2004 |

* cited by examiner

Primary Examiner — Daniel Mariam
Assistant Examiner — Nancy Bitar
(74) Attorney, Agent, or Firm — Jason D. Voight

(57) ABSTRACT

The present invention relates to a setup (100) for constructing a weed map. The setup (100) comprises an image recording unit (110; 110') having a video camera (112) and a relief-tracking laser camera (114), an image processing and evaluating unit (120), a data storage unit (130) connected to the latter, as well as a weed database (135). The setup (100) also comprises a light source (160), a position detection unit (150) equipped with a location finding element (152) and a location refining element (154) for determining the spatial coordinates supplied by the former more accurately. The image recording unit (110; 110'), the position detection unit (150) and the light source (160) are all in data communication connection with the image processing and evaluating unit (120). Furthermore, the image processing and evaluating unit (120) is provided with one or more controlling outputs (122, 124), wherein one of the outputs (124) is capable of establishing a data communication connection with the control unit (190) of a separate weeding apparatus.

14 Claims, 1 Drawing Sheet

SETUP FOR CONSTRUCTING A WEED MAP

Figure 1:
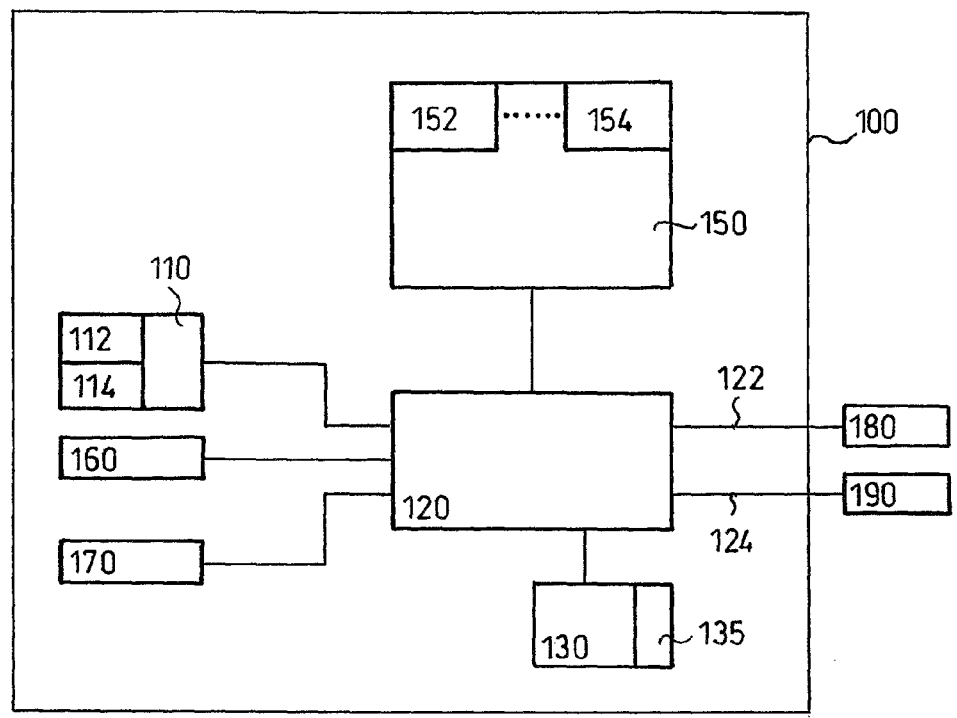

This is the National Stage of International Application PCT/HU2006/000038, filed Apr. 28, 2006.

The subject-matter of the present invention is a setup for constructing a weed map, comprising an image recording unit having a video camera and a relief-tracking laser camera, an image processing and evaluating unit, a data storage unit connected to the latter as well as a weed database.

German Patent Application No. 4,132,637 A1 discloses a method and an apparatus to effect elimination of weeds. According to the method, weeding takes place on the basis of a weed map. The weed map is constructed by the optical sensors and the video camera, all connected to a computer, of the weeding apparatus discussed in the document concerned. During the process of recording images, the apparatus is moving over a given path. The construction of the weed map is simply based on sensing the light reflected from the area that is scanned by the optical sensors and on analyzing the images recorded. During the analysis, the current image is studied and by considering its parts appearing in green as being weeded, the weed map is generated from the green pixels corresponding to the parts appearing in green. The weed map obtained in this way gives information about the extent of weediness, however, contains no information on the weed species causing the weediness itself.

Hungarian Patent Application No. P0202205 also discloses a weeding method effected on the basis of a weed map, as well as a weeding apparatus mounted onto a railway wagon for carrying out the method. Besides the extent of weediness, the weed map of the present construction also contains information about the weed species present on the area to be weeded. However, due to the integration of the weed map constructing unit with the weeding apparatus, the weed map constructing unit is of relatively great dimensions and allows merely the construction of a weed map attributed to the areas between the rails and optionally on the slope along the railway trackage. The weed map composed is closely related to the path of the tracks. Hence, the weed elimination method according to Hungarian Patent Application No. P0202205, which is highly preferred from environmental points of view and provides a procedure to be carried out on the basis of a weed map that enables relatively low consumption of chemical agents, can be applied on a relatively few areas (eg. along the railway trackage). A further drawback of the weed elimination method discussed in said Hungarian patent application is that the weed map can be constructed only at certain time of the day (i.e. during daylight) and under the existence of suitable light conditions (i.e. sufficient natural illumination for recording the images) by the method.

A yet further drawback of the weeding apparatus concerned is that in certain cases, eg. under rapidly changing light/shadow effects or as a consequence of image blurring due to the fast movement of the apparatus, the pieces of information related to the weed species can only be determined with uncertainty. This, however, can be quite disadvantageous when weed elimination is performed at a later time relative to the composition of the weed map in an aimed manner, i.e. by making use of species-specific herbicides. It can namely occur that due to the inaccurate identification of species, the weed map based weed elimination will not be performed with the herbicide that allows the most effective control of weeds actually present on a given area.

The present invention aims at eliminating the above drawbacks. In particular, the invention aims at providing a setup for constructing a weed map, wherein the setup can be either used alone essentially on any weed-covered area or be simply connected to any weed elimination apparatus existing nowadays for performing a weeding process on the basis of a weed map, wherein the weed map composed by the setup is of high spatial accuracy and reliably accounts for equally the topographical conditions of the area to be weeded, the extent of weediness and the weed species responsible for the weediness itself. A further aim of the invention to be achieved is to provide a setup that can be used reliably for the construction of a weed map, in case of need, even under low visibility conditions and/or at any time independently of the time of the day. A yet further aim to be achieved is to develop a setup for constructing a weed map that can be reliably used and also gives accurate pieces of information about the weed species even in strong sunlight or under rapidly changing light/shadow effects and/or when a large shift in the colour spectrum of the weed-covered area at sunrise/sunset occurs.

The invention based on the finding according to which it is advantageous to construct the weed map constructing unit as a stand-alone device that is physically disconnectable from the weeding apparatus, but is capable of establishing a data communication connection with the weeding control unit thereof, and furthermore to equip it with a position detection unit of its own. Furthermore, it is also advantageous to equip the setup for constructing a weed map with a light source of its own, the control of which (i.e. its switching on or off) is performed by the setup itself.

The above aims are achieved by having developed a setup for constructing a weed map comprising a light source, a position detection unit having a location finding element and at least one location refining element for determining more accurately the spatial coordinates supplied by the location finding element, wherein the image recording unit, the position detection unit and the light source are all in data communication connection with the image processing and evaluating unit, and wherein the image processing and evaluating unit is provided with one or more controlling outputs, wherein one of the controlling outputs is capable of establishing a data communication connection with the control unit of a separate weeding apparatus. The possible further embodiments of the setup for constructing a weed map are defined by the dependent claims.

Figure 2:
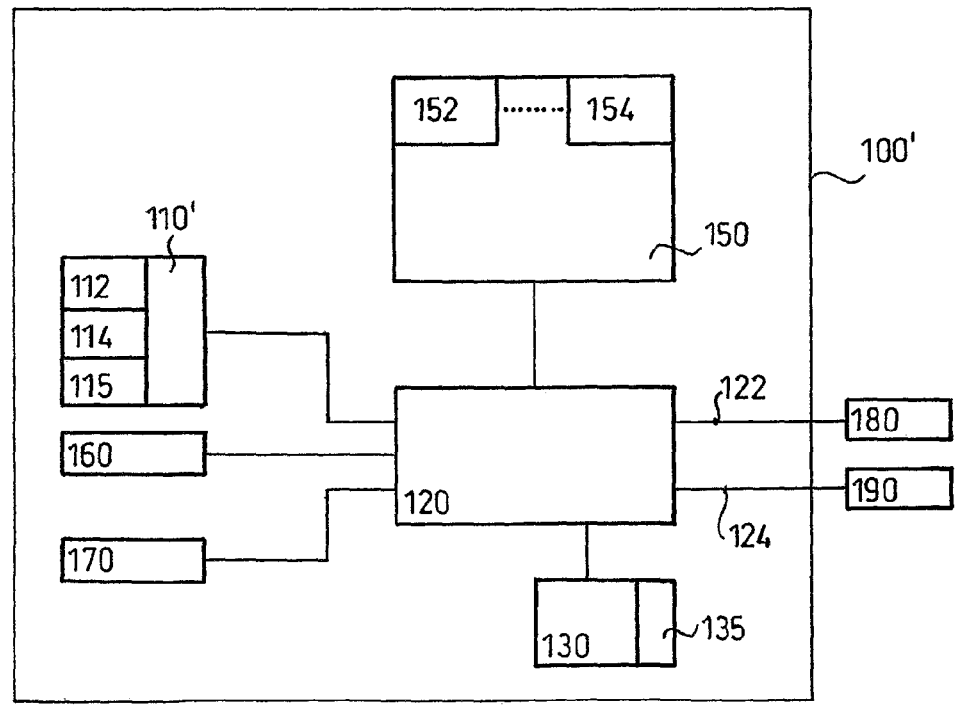

The invention and its preferred embodiments will be explained in detail with reference to the accompanied drawings, wherein FIG. 1 shows the block diagram of a possible embodiment of the setup for constructing a weed map according to the invention; and FIG. 2 illustrates the block diagram of a possible further embodiment of the setup for constructing a weed map according to the invention.

The setup 100 for constructing a weed map shown schematically in FIG. 1 comprises an image recording unit 110, an image processing and evaluating unit 120, a data storage unit 130, a weed database 135, a position detection unit 150 and a light source 160. The setup 100 for constructing a weed map is preferably also provided with a brightness sensor 170 and is optionally connected to a display unit 180. Furthermore, the setup 100 for constructing a weed map is constructed to be connectable to a control unit 190 of a separate weeding apparatus.

The image recording unit 110 can be mounted onto a carrier vehicle (such as eg. a railway vehicle or a suitable motor vehicle). The mounting is accomplished by means of a bracket equipped with a shock absorber that guarantees a vibration free position of the image recording unit 110 during movement of the carrier vehicle. The mounting by means of a bracket equipped with a shock absorber also guarantees that the image recording unit 110 does not move during its operation, and hence it can always record sharp images.

The task of the image recording unit 110 is to record successive images of the path traveled while the setup 100 for constructing a weed map is advancing, which provide definite visual information about the weediness of the path traveled on the one part, about weed species present on the path traveled on the other part and about the topographical conditions of the path traveled (i.e. about its slope or unevenness) on the third part. Therefore, the image recording unit 110 illustrated in FIG. 1 includes a video camera 112 and a relief-tracking laser camera 114. The video camera 112 is a high resolution colour camera, which is equipped with suitable optical elements (eg. with colour filters or polarizers known from the literature) for the elimination of the various disturbing light effects. The relief-tracking laser camera 114 is also a (high resolution) digital camera, the imaging process of which in a given range of wavelengths is assisted by a light source (not shown in the drawings) that emits laser light. This light source constitutes preferably a part of the laser camera 114, however this is not necessary. The video camera 112 and the laser camera 114 transmit the images recorded by them to the image processing and evaluating unit 120 via a wired (by means of a suitable data cable) or a wireless (eg. infrared or 'bluetooth') data transmission. In the embodiment shown in FIG. 1 the calculation of the extent of weediness and the identification of the weed species take place on basis of the shots recorded by the video camera 112, while the relief-tracking laser camera 114 serves for determining the topographical conditions.

The ability to operate the setup 100 for constructing a weed map, shown in FIG. 1, independently of the time of the day is assured by the light source 160, the switch-on and switch-off of which is performed by the image processing and evaluating unit 120 based on a signal of the brightness sensor 170. The light source 160 is a light source ensuring a concentrated illumination having a colour temperature corresponding to or approximating the colour temperature of (natural) daylight. The light source 160 is preferentially a metal-halid lamp. In order to achieve the best illumination of a portion being just recorded of the path travelled, in one of its preferred embodiments the light source 160 is integrated with the image recording unit 110.

The task of the position detection unit 150 is to determine the precise actual location of the image recording unit 110, and/or of the recorded video information, in order that the pieces of information on the weediness, weed species and topography obtained from the recorded pieces of video information could be assigned to the weed map under construction with the possible highest precision in terms of their spatial location. Hence, the position detection unit 150 includes a location finding element 152 and at least one location refining element 154 for determining more accurately the spatial coordinates supplied by the location finding element 152. In one of its preferred embodiments, the location finding element 152 is a satellite navigation device, eg. a GPS unit. In its further preferred embodiment, the location finding element 152 is a navigation device that exploits signals emitted by the base stations of a cellular telecommunication network.

In particular, the satellite based position determination allows a positioning with the accuracy of 10 cm if the image recording unit 110 is not moving. As the image recording unit 110, due to its motion, changes its position during the construction of the weed map, the GPS based determination of its actual position (and hence of the video information recorded) becomes relatively inaccurate (i.e. within the accuracy of 3-5 metres). To construct a weed map that can be used later as a basis of a planned and highly efficient weeding process, the actual location of the image recording unit 110 must be more accurately known. That is why the position detection unit 150 is equipped with the at least one additional location refining element 154.

Preferentially, the location refining element 154 is a transducer, preferably e.g. an angular displacement sensing transducer mounted on a wheel of the carrier vehicle effecting the movement of the image recording unit 110. Moreover, the location refining element 154 can also be provided by any other kinds of transducers, for example as a speed transducer sensing the velocity of the carrier vehicle with great precision. The task of the location refining element 154 is to refine the spatial coordinates supplied by the location finding element 152 (optionally, by the GPS unit) with respect to the actual location of the image recording unit 110 during its motion. Hence, the accuracy of the weed map is basically defined not by the information supplied by the location finding element 152, but by the transducer(s) sensing/calculating the displacement of the image recording unit 110, by means of which an accuracy of several centimetres can be accomplished. To accurately calculate the current position of the image recording unit 110 on the weed map, the transducer(s) used and the location finding element 152, preferably the GPS unit, are synchronized with each other when the image recording unit 110 does not move.

The coordinates supplied by the location finding element 152 and the location refining element 154 are transmitted to the image processing and evaluating unit 120 via a wired (by means of a suitable data cable) or a wireless (eg. infrared or 'bluetooth') data transmission by the position detection unit 150.

The pieces of video information coming from the video camera 112 and the laser camera 114 as well as the location type of information supplied by the position detection unit 150 are stored within the data storage unit 130. Preferentially, the data storage unit 130 is a fast access hard disk, but any other means suitable for data storage can be equally used. The weed database 135 constitutes part of the data storage unit 130 (i.e. it is stored therein), however this is not necessary; the weed database 135 can also be connected to the setup 100 for constructing a weed map as a separate unit (e.g. in the form of a firmware).

Basically, the task of the image processing and evaluating unit 120 of the setup 100 shown in FIG. 1 is to determine the extent of weediness and the weed species responsible for the weediness, as well as the topographical conditions on the basis of processing the images of the video camera 112 and the laser camera 114, and then to store the thus obtained pieces of information as a weed map in accordance with the spatial coordinates provided by the position detection unit 150. The image processing and evaluating unit 120 performs the processing of the obtained pieces of information by means of a suitably preprogrammed software, the individual steps of which are carried out by a processor (not shown in the drawings) constituting part of the image processing and evaluating unit 120. The weed-infected portions of the path traveled are defined by a weediness reporting algorithm of the software by taking the green shaded parts of the images recorded by the video camera 112 into consideration. The smallest portion that can be identified as a weed spot by the setup 100 for constructing a weed map according to the invention, taking the resolution of the setup 100 into consideration, is represented by an area of 10 by 10 centimetres. Identification of weed species takes place via spectrum analysis and shape recognition by means of a comparison with the species-specific pieces of information about weeds contained within the weed database 135. Furthermore, to ensure a compact configuration of the setup 100 for constructing a weed map according to the invention, the image processing and evaluating unit 120, the data storage unit 130 and the weed database 135 are all formed as parts of a personal computer (eg. of a laptop PC).

The image processing and evaluating unit 120 is also provided with at least two controlling outputs 122, 124. One of the controlling outputs 122 is formed in such a way that the image processing and evaluating unit 120 can be connected to a display unit 180 through it. For the real-time visualization of the weed map and of the pieces of information incoming to the image processing and evaluating unit 120, the display unit 180 is formed as a screen, preferably as a touch screen. To ensure printability of the pieces of information concerned, the display unit 180 can also be provided in the form of a printing device.

A further controlling output 124 is formed in such a way that a data communication connection could be established through it between the image processing and evaluating unit 120 and a control unit 190 of a separate weeding apparatus. This aims at providing a direct downloadability of the prepared weed map into the weeding apparatus to determine the parameters required (type of the herbicide, required dosage thereof, location and period of time of delivery) for accomplishing the elimination of weeds. The data transmission can be again either a wired transmission or a wireless one.

The setup 100' for constructing a weed map shown in FIG. 2 differs from the setup 100 illustrated in FIG. 1 in the feature that to ensure an ability of identification of various weed species with higher accuracy, its image recording unit 110' includes a species refining laser camera 115 too besides the video camera 112 and the relief-tracking laser camera 114. The species refining laser camera 115 is a high resolution digital camera, the imaging process of which in a given range of wavelengths is assisted by a light source (not shown in the drawings) that emits high intensity laser light. Preferentially, the laser light emitting light source is provided by one or more laser diodes that emit in narrow wavelength band(s) characteristic to the weeds in the infrared-visible range of the electromagnetic spectrum. Preferentially, the laser light emitting light source constitutes part of the species refining laser camera 115, however this is not necessary; the laser light emitting light source can also be provided as part of the light source 160. The output of the laser light emitting light source is adjusted in such a manner that the intensity of the coherent light emitted thereby on the illuminated spot is significantly greater, preferably ten times greater than the measured intensity of natural sunlight (and of the light being emitted by the light source 160 optionally also being operated) on the spot considered. It should be noted here, that said laser light source plays basically the role of a regular flash. The effects of natural illumination that might disturb the video camera 112 (eg. the rapidly changing light/shadow effects, the large shifts emerging at sunrise/sunset in the colour spectra of the images recorded) and/or the effects due to a rapid motion of the image recording unit 110' of the setup 100' for constructing a weed map (eg. blurred images) can be eliminated by the application of an instantaneous illumination with the laser light. Due to the illumination with the laser light, the effect of the Sun does not dominate on the spot illuminated by means of suitable optical means (not shown in the drawings), and hence images of constant intensity can be recorded by the laser camera 115 even under relatively different light conditions. The images that are recorded in presence of an illumination by the short pulses remain stationary even at high velocities, and are significantly sharper than those recorded from the same area by the video camera 112. Thus, on basis of the weed database 135, with the usage of appropriate shape recognition algorithms and considering the images recorded by the species refining laser camera 115 and comparing these images with those recorded by the video camera 112, the identification of weed species can be accomplished in this case more accurately by the image processing and evaluating unit 120 than in the case of setup 100 shown in FIG. 1, which results in the enhanced reliability of the weed map constructed.

In what follows the application of setups 100, 100' according to the invention is discussed in detail for the construction of a weed map.

After mounting the image recording unit 110, 110' onto the carrier vehicle, and yet in a stationary position of the image recording unit 110, 110', the location finding element 152 and the location refining element 154 are synchronized with each other. In this way, on basis of the location refining element's 154 signal, the location of the image recording unit 110, 110' will be accurately known in every moment during the coupled movement of the image recording unit 110, 110' and the carrier vehicle. After synchronization the carrier vehicle commences to move and the image recording unit 110, 110' starts simultaneously its operation, that is, it records images of the path traveled and of the weed vegetation covering the path. The images are recorded by the high precision colour video camera 112 and the relief-tracking laser camera 114, along with a homogeneous illumination by the light source 160 in case of need. The thus obtained video information is transmitted by means of wired or wireless data transmission to the image processing and evaluating unit 120. The required switch-on or switch-off of the light source 160 is controlled by the image processing and evaluating unit 120 on basis of the incoming signal of the brightness sensor 170. If the image recording unit 110' is to be used, the laser light emitting light source, that is associated with the species refining laser camera 115 and is functioning as a regular flash, also starts to operate simultaneously with the displacement of the carrier vehicle, and along with the instantaneous illumination by means of the laser light, the laser camera 115 also records images of the path traveled. These images are also transmitted by means of wired or wireless data transmission to the image processing and evaluating unit 120.

Then, based on the incoming pieces of video information the extent of weediness is calculated, the species identification of the weed species responsible for the weediness is carried out and the topographical conditions of the path traveled are determined by the image processing and evaluating unit 120. For this purpose, spectral examination algorithm(s) analyzing the colours and the habit of the weeds in the images is/are carried out, and/or the frames received from the video camera 112—and optionally from the laser camera 115—and made freezing are subjected to shape recognition algorithm(s). The application of shape recognition algorithm(s) is/are required as emissions of light of the various weeds are characteristic to the emitting weeds, however, they are quite close in wavelength to each other. The recognition of weeds is performed on basis of the data of the weed base 135 stored previously.

After completing the analysis of the incoming pieces of video information, for a later usage the weediness of the area currently under study, the weed species responsible for its weediness and the topographical conditions, as well as the accurate coordinates supplied by the position detection unit 150 are stored as a weed map in the data storage unit 130 and/or forwarded to the display unit 180. To effect the elimination of weeds, the weed map thus composed can be transmitted at the same time to the control unit 190 of a separate weeding apparatus too.

The weed map composed by the setup 100, 100' for constructing a weed map according to the invention contains both the starting and the arrival coordinates, the path traveled, the distance covered expressed in metre units, the coordinates of the path traveled (preferably eg. its GPS coordinates refined by the transducers), the extent of weediness in % units and for a unit area, as well as the weed species detected.

The setup 100, 100' for constructing a weed map according to the invention has the following advantages:

- it can be operated physically disconnected from and independently of the weeding apparatus basically in any environment, however, to carry out the weeding, the weed map composed by the setup 100, 100' can be easily downloaded to the weeding apparatus after the setup 100, 100' has been connected to the apparatus;
- a weed map that is of high accuracy and also contains the weed species besides the weediness can be constructed by the setup 100, 100' at any time of the day and/or under inadequate natural illumination conditions, too;
- the identification of weed species charted into the weed map can be performed with great accuracy even when the light/shadow effects are changing relatively rapidly; this ensures that when a weeding process is effected on basis of the weed map, species-specific herbicides that are the most effective in terms of the elimination of weeds covering a certain area will be sprayed on the area to be weeded.

The invention claimed is:

1. A setup (100) for constructing a weed map independently of the time of the day, comprising an image recording unit (110; 110'), an image processing and evaluating unit (120), a data storage unit (130) connected to the latter, a weed database (135), a light source (160) and a position detection unit (150) having a location finding element (152), wherein the image recording unit (110; 110'), the position detection unit (150) and the light source (160) are all in data communication connection with the image processing and evaluating unit (120), and wherein the image processing and evaluating unit (120) is provided with one or more controlling outputs (122, 124), wherein one of the controlling outputs (124) is capable of establishing a data communication connection with the control unit (190) of a separate weeding apparatus, characterized in that the image recording unit (110; 110') comprises a video camera (112) for recording successive images of the path traveled by the setup (100) and illuminated by the light source (160), wherein said light source (160) is at least partly provided by a light source emitting light having a colour temperature approximating the colour temperature of natural light;

the image recording unit (110; 110') further comprises a relief tracking laser camera (114) for determining topographical conditions of the path traveled; and the position detection unit (150) further comprises at least one location refining element (154) for determining more accurately the spatial ordinates supplied by the location finding element (152).

2. The setup for constructing a weed map according to claim 1, characterized in that the image recording unit (110; 110') is equipped with a laser camera (115) for refining weed species.

3. The setup for constructing a weed map according to claim 2, characterized in that the light source (160) is at least partly constituted by one or more laser diodes emitting high intensity coherent light with a wavelength being in the infrared range of the electromagnetic spectrum.

4. The setup for constructing a weed map according to claim 1, characterized in that the location finding element (152) is a satellite navigation device (GPS).

5. The setup for constructing a weed map according to claim 1, characterized in that the location finding element (152) is a navigation device that exploits signals emitted by the base stations of a cellular telecommunication network.

6. The setup for constructing a weed map according to claim 5, characterized in that the location refining element (154) is an angular displacement sensing transducer.

7. The setup for constructing a weed map according to claim 1, characterized in that it comprises a brightness sensor (170) which is connected to the image processing and evaluating unit (120).

8. The setup for constructing a weed map according to claim 1, characterized in that the weed database (135) constitutes part of the data storage unit (130).

9. The setup for constructing a weed map according to claim 1, characterized in that the image processing and evaluating unit (120), the data storage unit (130) and the weed database (135) all constitute parts of a personal computer.

10. The setup for constructing a weed map according to claim 1, characterized in that one of the controlling outputs (122) is in data communication connection with a display unit (180).

11. The setup for constructing a weed map according to claim 10, characterized in that the display unit (180) is a screen, preferably a touch screen.

12. The setup for constructing a weed map according to claim 10, characterized in that the display unit (180) is a printing device.

13. The setup for constructing a weed map according to claim 1, characterized in that the light source (160) is integrated with the image recording unit (110; 110').

14. The setup for constructing a weed map according to claim 1, characterized in that the light source (160) is provided by individual light sources being physically separated from each other.

* * * * *